(12) United States Patent
Park et al.

(10) Patent No.: US 7,812,904 B2
(45) Date of Patent: Oct. 12, 2010

(54) LIQUID CRYSTAL DISPLAY DEVICE AND METHOD FOR DESIGNING THE SAME

(75) Inventors: Ku-Hyun Park, Gyeonggi-Do (KR); Ki-Bok Park, Gyeonggi-Do (KR); Jong-Hwae Lee, Seoul (KR)

(73) Assignee: LG Display Co., Ltd., Seoul (KR)

( * ) Notice: Subject to any disclaimer, the term of this patent is extended or adjusted under 35 U.S.C. 154(b) by 184 days.

(21) Appl. No.: 12/285,607

(22) Filed: Oct. 9, 2008

(65) Prior Publication Data
US 2009/0096964 A1 Apr. 16, 2009

(30) Foreign Application Priority Data
Oct. 9, 2007 (KR) .................. 10-2007-0101682

(51) Int. Cl.
*G02F 1/1333* (2006.01)
(52) U.S. Cl. ...................... 349/113; 349/194
(58) Field of Classification Search ............ 359/485; 349/96, 101, 113, 114, 123, 193, 194, 201
See application file for complete search history.

(56) References Cited

U.S. PATENT DOCUMENTS

| | | | |
|---|---|---|---|
| 5,953,091 A * | 9/1999 | Jones et al. ............. | 349/129 |
| 6,373,543 B1 * | 4/2002 | Cacharelis ............. | 349/123 |
| 6,522,380 B2 * | 2/2003 | Lee et al. ............... | 349/141 |
| 6,538,711 B2 * | 3/2003 | Funahata et al. ........ | 349/113 |
| 6,841,654 B2 * | 1/2005 | Gu et al. ................. | 528/393 |
| 7,397,527 B2 * | 7/2008 | Lin ........................ | 349/123 |
| 7,692,759 B2 * | 4/2010 | Escuti et al. ............ | 349/201 |

* cited by examiner

*Primary Examiner*—Akm E Ullah
(74) *Attorney, Agent, or Firm*—Morgan Lewis & Bockius LLP

(57) ABSTRACT

A trans-reflective type In-Plane Switching (IPS)-LCD device capable of implementing a single gap and a wide viewing angle, and minimizing an occurrence area of disclination at an interface between a transmission region and a reflection region, and a method for designing the same. First and second alignment layers have characteristics to allow LC in a transmission region can be aligned in the same direction as a transmission axis of a lower polarizer. A third alignment layer is aligned so that the LC in the reflection region can be twisted from a lower side to an upper side with a predetermined twisted angle (θ). Here, the twisted angle (θ) of the LC in the reflection region, and an angle (α) between an alignment direction of an uppermost LC in the reflection region and the transmission axis of the upper polarizer are set so that optical reflectivity in the reflection region is '0' when the LC is not driven.

8 Claims, 8 Drawing Sheets

LIQUID CRYSTAL DISPLAY DEVICE AND METHOD FOR DESIGNING THE SAME

RELATED APPLICATION

The present invention relates to subject matter contained in priority Korean Application No 10-2007-0101682, filed Oct. 9, 2007, which is herein expressly incorporated by reference in its entirety.

BACKGROUND OF THE INVENTION

1. Field of the Invention

The present invention relates to a liquid crystal display (LCD) device and a method for designing the same, and more particularly, to a trans-reflective type In-Plane Switching (IPS)-LCD device capable of implementing a single gap and a wide viewing angle, and minimizing an occurrence area of disclination at an interface between a transmission region and a reflection region, and a method for designing the same.

2. Description of the Background Art

Nowadays, liquid crystal display (LCD) devices are being widely used due to their advantageous characteristics such as light weight, thin thickness, and small power consumption. Accordingly, the LCD devices are being widely applied to portable electronic devices such as a notebook and a portable phone.

The LCD device displays desired images on a screen by controlling an amount of optical transmissivity according to image signals applied to a plurality of control switching devices arranged in a matrix form.

The LCD device comprises a color filter substrate that is an upper substrate, a thin film transistor (TFT) array substrate that is a lower substrate, an LC panel having an LC layer and disposed between the color filter substrate and the TFT array substrate, and an LC panel driving unit for driving the LC panel by supplying scan signals and image information to the LC panel.

A cathode ray tube (CRT) or a light emitting diode (LED) are spontaneous light emitting device, whereas the LCD device is a non-spontaneous light emitting device. Accordingly, for image implementation, it is necessary for the LCD device to be provided with a light source to supply light to the LC panel.

The LCD device may be largely classified into two types. One is a transmission type using a light source disposed inside the LCD device, and the other is a reflection type using an external light source (e.g., sunlight).

However, the transmission type LCD device requires large power consumption due to an internal light source such as a portable battery. Accordingly, when the transmission type LCD device is applied to portable electronic devices, a long usage time is not obtained due to limitations of a capacity of the portable battery. Accordingly, advantages of a portable characteristic can not be implemented. Furthermore, when the reflection type LCD device is utilized at an indoor room, an external light source such as sunlight is weak to cause a dark brightness and thereby to degrade a screen quality.

To solve these problems, has been proposed a trans-reflective type electrically controlled birefringence (ECB) LCD device that combines the transmission type LCD and the reflection type LCD with each other. The trans-reflective type ECB-LCD device can be easily applied to portable electronic devices due to its small power consumption, and can provide a high quality screen not only indoors but also outdoors.

Hereinafter, the trans-reflective type ECB-LCD device will be explained in more detail with reference to the attached drawings.

FIG. 1 shows a general trans-reflective type ECB-LCD device in accordance with the conventional art.

Referring to FIG. 1, the trans-reflective type ECB-LCD device comprises a first substrate 1 and a second substrate 2 each having a transmission region and a reflection region; at least one of phase compensation plates 16a and 16b, and a lower polarizer 3 below the first substrate 1; and at least one of phase compensation plates 17a and 17b, and an upper polarizer 4 above the second substrate 2. A first pixel electrode 5a and a second pixel electrode 5b for applying an electric field to an LC layer 8 are formed on the first substrate 1 in a transmission region and a reflection region, respectively. The first pixel electrode 5a and the second pixel electrode 5b are electrically connected to each other. A color filter 20 and a common electrode 6 are formed on the second substrate 2. The common electrode 6 forms an electric field together with the first and second pixel electrodes 5a and 5b on the first substrate 1, thereby driving the LC layer 8.

The first pixel electrode 5a in the transmission region is formed of a transparent conductive material having comparatively high optical transmissivity, thereby transmitting light supplied from an internal light source and easily emitting the light outside the LCD device. On the contrary, the second pixel electrode 5b in the reflection region is formed of an opaque conductive metallic material having comparatively high reflectivity, thereby easily reflecting external light incident from outside.

In the reflection region of the conventional trans-reflective type ECB-LCD device, light incident from an external light source passes through the LC layer two times. However, in the transmission region, light supplied from an internal light source passes through the LC layer one time. In order to compensate different optical characteristics between the reflection region and the transmission region, the conventional trans-reflective type ECB-LCD device has a dual cell gap structure that a cell gap (d) in the transmission region is two times a cell gap (d/2) in the reflection region.

However, the trans-reflective type ECB-LCD device having a dual cell gap structure does not have simplified fabrication processes due to a stepped portion between the reflection region and the transmission region, thereby causing low productivity.

Furthermore, in the trans-reflective type ECB-LCD device, LC molecules are driven by a vertical electric field formed by the first and second pixel electrodes on the first substrate, and the common electrode on the second substrate. This may cause a narrow viewing angle.

SUMMARY OF THE INVENTION

Therefore, it is an object of the present invention to provide a trans-reflective type In Plane Switching (IPS)-liquid crystal display (LCD) device capable of implementing a single gap, obtaining a wide viewing angle, and minimizing an area of disclination occurring at an interface between a transmission region and a reflection region, and a method for designing the same.

To achieve these and other advantages and in accordance with the purpose of the present invention, as embodied and broadly described herein, there is provided a trans-reflective type In-Plane Switching (IPS) liquid crystal display (LCD) device, comprising: a first substrate and a second substrate having a reflection region and a transmission region each having the same cell gap (d); a first alignment layer formed on the first substrate; a second alignment layer formed in the transmission region on the second substrate facing the first substrate; a third alignment layer formed in the reflection region on the second substrate facing the first substrate; a lower polarizer formed below the first substrate; an upper polarizer formed above the second substrate, and having a transmission axis perpendicular to a transmission axis of the lower polarizer; a pixel electrode and a common electrode formed on the first substrate, and forming a horizontal electric field; a reflection layer formed in the reflection region on the first substrate, and reflecting light incident from outside; and a liquid crystal (LC) layer formed between the first substrate and the second substrate.

Here, the first and second alignment layers have characteristics to align the LC in the transmission region in the same direction as the transmission axis of the lower polarizer.

Here, the third alignment layer has characteristics to allow the LC in the reflection region to be twisted from a lower side to an upper side with a predetermined twisted angle ($\theta$).

Here, the twisted angle ($\theta$) of the LC in the reflection region, and an angle ($\alpha$) between an alignment direction of an uppermost LC in the reflection region and the transmission axis of the upper polarizer are set so that optical reflectivity in the reflection region is '0' when the LC is not driven.

To achieve these and other advantages and in accordance with the purpose of the present invention, as embodied and broadly described herein, there is also provided a method for designing a liquid crystal display (LCD) device, comprising: preparing first and second substrates that define a reflection region and a transmission region each having the same call gap (d); forming a pixel electrode and a common electrode on the first substrate; forming a reflection layer on the first substrate in the reflection region; forming a first alignment layer on the first substrate; forming a second alignment layer on the second substrate in the transmission region, and forming a third alignment layer on the second substrate in the reflection region; forming a lower polarizer below the first substrate; forming an upper polarizer above the second substrate, the upper polarizer having a transmission axis perpendicular to a transmission axis of the lower polarizer; and forming an LC layer formed between the first and second substrates, wherein the first and second alignment layers undergo rubbing treatment so that the LC in the transmission region between the first and second substrates alignment can be aligned in the same direction as the transmission axis of the lower polarizer, wherein the third alignment layer is aligned so that the LC in the reflection region can be twisted from a lower side to an upper side with a predetermined twisted angle ($\theta$), and wherein the twisted angle ($\theta$) of the LC in the reflection region, and an angle ($\alpha$) between an alignment direction of an uppermost LC in the reflection region and the transmission axis of the upper polarizer are set so that optical reflectivity in the reflection region is '0' when the LC is not driven.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIGS. 7A to 7C are photos of pixels according to driving of LC, in which FIG. 7A is a photo showing a pixel when non-alignment regions do not exist at an interface between a transmission region and a reflection region; and FIGS. 7B and 7C are photos each showing a pixel when non-alignment regions exist at the interface between the transmission region and the reflection region.

DETAILED DESCRIPTION OF THE INVENTION

Reference will now be made in detail to the preferred embodiments of the present invention, examples of which are illustrated in the accompanying drawings.

Hereinafter, a liquid crystal display (LCD) device and a method for designing the same according to a preferred embodiment of the present invention will be explained in more detail with reference to the attached drawings.

Firstly, the configuration of the LCD device will be explained.

Figure 1:
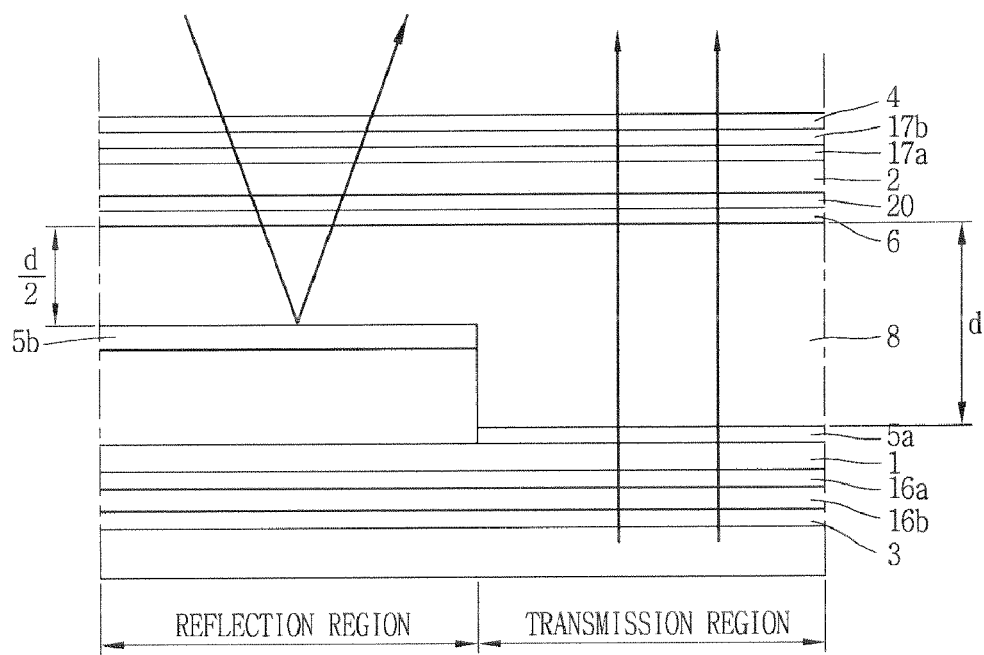
FIG. 1 shows a general trans-reflective type electrically controlled birefringence (ECB)-liquid crystal display (LCD) device in accordance with the conventional art.
Figure 2:
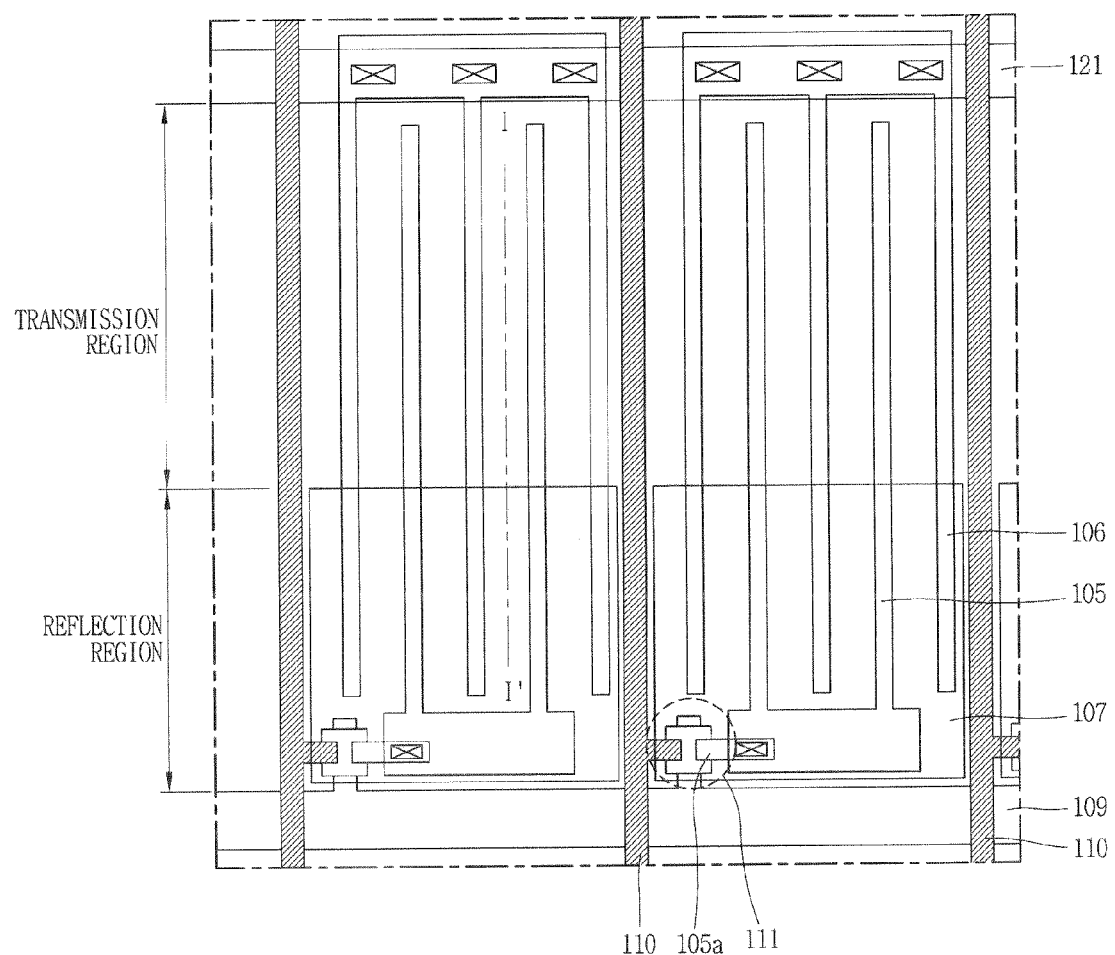
FIG. 2 is a planar view of an LCD device according to one embodiment of the present invention.
Figure 3:
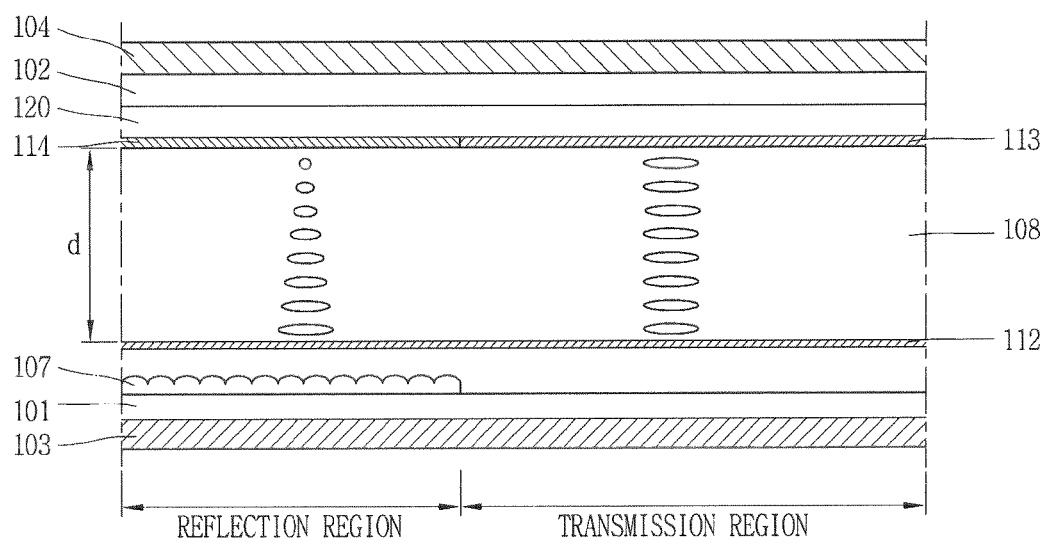
FIG. 3 is a sectional view taken along line 'I-I' in FIG. 1.

Referring to FIGS. 2 and 3, the LCD device according to a first embodiment of the present invention comprises: a first substrate 101 and a second substrate 102 having a reflection region and a transmission region each having the same call gap (d); a first alignment layer 112 formed on the first substrate 101; a second alignment layer 113 formed in the transmission region on the second substrate 102 facing the first substrate 101; a third alignment layer 114 formed in the reflection region on the second substrate 102 facing the first substrate 101; a lower polarizer 103 formed below the first substrate 101; an upper polarizer 104 formed above the second substrate 102, and having a transmission axis perpendicular to a transmission axis of the lower polarizer 103; a pixel electrode 105 and a common electrode 106 formed on the first substrate 101, and forming a horizontal electric field; a reflection layer 107 formed in the reflection region on the first substrate 101, and reflecting light incident from outside; and an LC layer 108 formed between the first substrate 101 and the second substrate 102.

Here, the first and second alignment layers 112 and 113 have characteristics to align the LC in the transmission region in the same direction as the transmission axis of the lower polarizer. The third alignment layer has characteristics to allow the LC in the reflection region to be twisted from a lower side to an upper side with a predetermined twisted angle ($\theta$).

Here, the twisted angle ($\theta$) of the LC in the reflection region, and an angle ($\alpha$) between an alignment direction of an uppermost LC in the reflection region and the transmission axis of the upper polarizer 104 are set so that optical reflectivity in the reflection region is '0' when the LC is not driven.

Referring to FIG. 3, the LCD device comprises a first substrate 101, a thin film transistor (TFT) array substrate; a second substrate 102, a color filter substrate; and an LC layer 108 disposed between the first and second substrates 101 and 102. The first substrate 101 and the second substrate 102 define a transmission region and a reflection region having the same cell gap (d), respectively.

A lower polarizer 103 is disposed below the first substrate 101, and an upper polarizer 104 is disposed above the second substrate 102. The lower polarizer 103 has a transmission axis perpendicular to a transmission axis of the upper polarizer 104.

Referring to FIG. 2, a plurality of gate lines 109 and data lines 110 are formed to cross each other, thereby defining a plurality of pixels. At each intersect between the gate lines 109 and the data lines 110, a thin film transistor 111 is formed.

At each pixel, provided are a pixel electrode 105 and a common electrode 106 spacing from each other and formed to be alternate each other. The pixel electrode 105 is connected to a drain electrode 110b of the TFT 111 formed at a corresponding pixel, and the common electrode 106 is connected to a common voltage line 121.

The pixel electrode 105 and the common electrode 106 are formed on the first substrate 101 to form a horizontal electric field, thereby driving the LC layer 108. Accordingly, a wide viewing angle is obtained.

Referring to FIGS. 2 and 3, a reflection layer 107 for reflecting light incident from outside is formed in the reflection region on the first substrate 101. In order to enhance optical reflectivity, the reflection layer 107 is provided with a plurality of embossing patterns having a plurality of curved surfaces on the surface thereof.

Referring to FIG. 3, one of red (R), green (G), and blue (B) color filters 120 is formed at each pixel on the second substrate 102. Although not shown, a black matrix is formed at an interface between each pixel where the R, G, and B color filters 120 are formed.

Referring to FIG. 3, the first alignment layer 112 rubbed in the same direction as the transmission axis of the lower polarizer 103 is formed on the first substrate 101. The second alignment layer 113 rubbed in the same direction as the transmission axis of the lower polarizer 103 is formed in the transmission region on the second substrate 102. The third alignment layer 114 rubbed in a direction having a predetermined angle from the transmission axis of the upper polarizer 104 is formed in the reflection region on the second substrate 102.

Accordingly, the LC in the transmission region is aligned in the same direction as the transmission axis of the lower polarizer 103, and the LC in the reflection region is aligned so as to be twisted from a lower side to an upper side with a predetermined twisted angle (θ).

Here, an angle between the rubbing direction of the first alignment layer 112 and the rubbing direction of the third alignment layer 114 is set within a range of 5°~85°. And, an angle between the rubbing direction of the third alignment layer 114 and the transmission axis of the upper polarizer 104 in the reflection region is set within a range of 5°~85°. Accordingly, the LC in the reflection region has a twisted angle (θ) of 5°~85°, and an angle (α) between an alignment direction of an uppermost LC in the reflection region and the transmission axis of the upper polarizer 104 is within a range of 5°~85°.

Here, the twisted angle (θ) of the LC in the reflection region, and the angle (α) between an alignment direction of an uppermost LC in the reflection region and the transmission axis of the upper polarizer 104 are set so that optical reflectivity in the reflection region is '0' when the LC is not driven.

More concretely, since the LC in the transmission region is aligned in a direction perpendicular to the transmission axis of the upper polarizer 104, the transmission region implements black when the LC is not driven.

Accordingly, the reflection region has to also implement black when the LC therein is not driven. In order for the reflection region to implement black, reflectivity of light incident from outside has to be '0'. That is, both the transmission region and the reflection region have to be in 'normally black mode'.

When optical reflectivity in the reflection region is '0', the twisted angle (θ) of the LC in the reflection region, and the angle (α) between an alignment direction of an uppermost LC in the reflection region and the transmission axis of the upper polarizer 104 may be obtained from an equation representing optical reflectivity (R). The equation representing optical reflectivity (R) is derived by using Jone's matrix, which is represented as the following equation 1.

$$R = \left| (\cos\alpha \sin\alpha) HMHM \begin{pmatrix} \cos\alpha \\ \sin\alpha \end{pmatrix} \right|^2 \quad \text{[Equation 1]}$$

Here, 'α' denotes an angle between an alignment direction of an uppermost LC in the reflection region, and the transmission axis of the upper polarizer 104. And, 'H' and 'M' are represented as the following equations.

$$H = \begin{pmatrix} \cos\alpha & \sin\alpha \\ \sin\theta & -\cos\theta \end{pmatrix} \quad \text{[Equation 2]}$$

$$M = \begin{pmatrix} A - iB & -C - iD \\ C - iD & A + iB \end{pmatrix} \quad \text{[Equation 3]}$$

Here, 'θ' is a twisted angle of the LC in the reflection region, and 'A, B, C and D' are represented as the following equations 4, 5, 6 and 7.

$$A = \cos\theta\cos\beta d + \frac{\theta}{\beta d}\sin\theta\sin\beta d \quad \text{[Equation 4]}$$

$$B = \frac{k_a}{\beta}\cos\theta\sin\beta d \quad \text{[Equation 5]}$$

$$C = \sin\theta\cos\beta d - \frac{\theta}{\beta d}\cos\theta\sin\beta d \quad \text{[Equation 6]}$$

$$D = \frac{k_a}{\beta}\sin\theta\sin\beta d \quad \text{[Equation 7]}$$

Here, 'd' denotes an LC cell gap in the reflection region, and Δn denotes refractive anisotropy of the LC. And, βd and $k_a$ are represented as the following equations 8 and 9.

$$k_a = \pi\Delta n/\lambda \quad \text{[Equation 8]}$$

$$\beta d = (k_a^2 d^2 + \theta^2)^{\frac{1}{2}} \quad \text{[Equation 9]}$$

Here, 'λ' denotes a wavelength of light supplied to the reflection region from an external light source.

Firstly, any angle (α) between an alignment direction of an uppermost LC in the reflection region, and the transmission axis of the upper polarizer 104 is obtained within a range of 5°~85°. Then, the obtained angle is applied to the equations 1 to 9, thereby obtaining a graph showing optical reflectivity (R) according to the twisted angle (θ) and a phase difference (Δnd) of the LC in the reflection region. Then, the twisted angle (θ) of the LC in the reflection region is an angle when the optical range (R) is '0'' within the phase difference (Δnd) of the LC.

The angle 'α' between an alignment direction of an uppermost LC in the reflection region and the transmission axis of the upper polarizer 104, and the twisted angle (θ) of the LC in the reflection region obtained by the equations 1 to 9 are utilized, thereby implementing the trans-reflective type IPS-LCD device having the same cell gap (d) between the reflection region and the transmission region.

Hereinafter, will be explained a method for designing the twisted angle (θ) of the LC in the reflection region that can implement a single cell gap with the transmission region, and the angle (α) between an alignment direction of an uppermost LC in the reflection region and the transmission axis of the upper polarizer 104.

Firstly, the first substrate 101 and the second substrate 102 that define a reflection region and a transmission region having the same cell gap (d) are provided.

Then, the pixel electrode 105 and the common electrode 106 are formed on the first substrate 101.

Then, the reflection layer 107 is formed in the reflection region on the first substrate 101.

Then, the first alignment layer 112 is formed on the first substrate 101, the second alignment layer 113 is formed in the transmission region on the second substrate 102, and the third alignment layer 114 is formed in the reflection region on the second substrate 102.

Then, the lower polarizer 103 is formed below the first substrate 101, and the upper polarizer 104 having a transmission axis perpendicular to a transmission axis of the lower polarizer 103 is formed above the second substrate 102.

Then, an LC layer is formed between the first substrate 101 and the second substrate 102. The method for designing the first alignment layer 112 on the first substrate 101, the second alignment layer 113 on the second substrate 102, and the third alignment layer 114 on the second substrate 102 will be explained in more detail.

Firstly, an angle (α) between the alignment direction of the uppermost LC in the reflection region and the transmission axis of the upper polarizer 104, that is, an angle between the alignment direction of the third alignment layer 114 and the transmission axis of the upper polarizer 104 is arbitrarily set within a range of 5°~85°.

For convenience, the angle (α) between the alignment direction of the uppermost LC in the reflection region and the transmission axis of the upper polarizer 104 will be set as 30°.

Then, a graph showing optical reflectivity (R) according to the twisted angle (θ) and the phase difference (Δnd) of the LC in the reflection region when the LC is not driven is obtained by utilizing the equations 1 to 9. Since the twisted angle (θ) of the LC in the reflection region when the LC is not driven is determined by an alignment direction of the first alignment layer 112 and an alignment direction of the third alignment layer 114, the twisted angle (θ) corresponds to an angle between the alignment direction of the first alignment layer 112 and the alignment direction of the third alignment layer 114.

Figure 4:
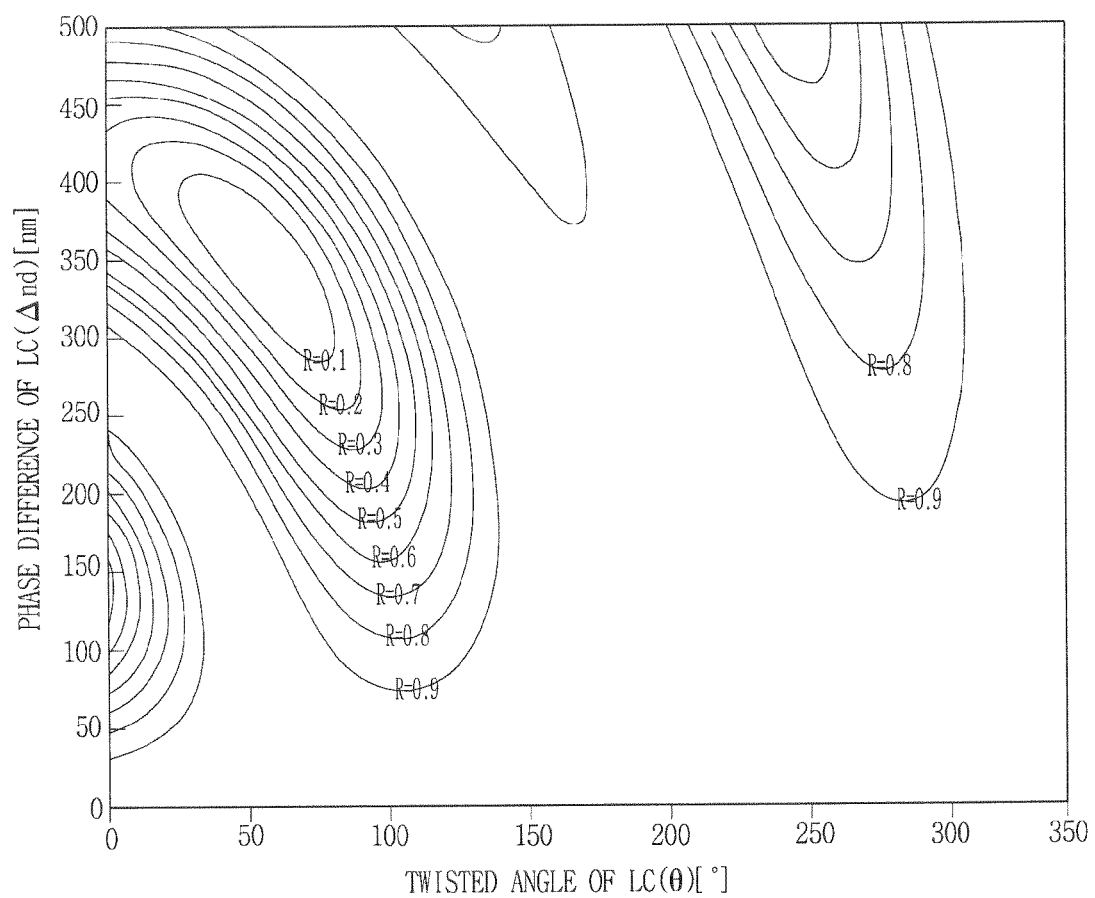
FIG. 4 is a graph showing optical reflectivity (R) according to a twisted angle ($\theta$) and a phase difference ($\Delta$nd) of LC in a reflection region in FIG. 2 when an angle ($\alpha$) between an alignment direction of an uppermost LC in the reflection region and a transmission axis of an upper polarizer is 30°.

The graph showing optical reflectivity (R) in the reflection region when the LC is not driven is shown in FIG. 4.

FIG. 4 is a graph showing optical reflectivity (R) according to a twisted angle (θ) and a phase difference (Δnd) of the LC in the reflection region when an angle (α) between an alignment direction of an uppermost LC in the reflection region and the transmission axis of the upper polarizer is 30°.

Then, by referring to the graph showing optical reflectivity (R), a twisted angle (θ) of the LC when the optical reflectivity (R) is '0' is obtained within a range of a phase difference (Δnd) of the LC of the LCD device according to the present invention.

More concretely, as shown in FIG. 4, the phase difference (Δnd) of the LC of the LCD device according to the present invention is about 300 nm~340 nm. Accordingly, within the range of 300 nm~340 nm, the twisted angle (θ) of the LC in the reflection region when the optical reflectivity (R) is '0' is about 60°.

Once the angle (α) between an alignment direction of an uppermost LC in the reflection region and the transmission axis of the upper polarizer 104 is arbitrarily set within a range of 5°~85°, the twisted angle (θ) of the LC in the reflection region is within a range of 5°~85°.

An angle between the alignment direction of the third alignment layer 114 and the transmission axis of the upper polarizer 104 is set to be 30°, and an angle between alignment directions of the first alignment layer 112 and the third alignment layer 114 are set to be 60°. Accordingly, the angle (α) between an alignment direction of an uppermost LC in the reflection region and the transmission axis of the upper polarizer 104 can be 30°, and the twisted angle (θ) of the LC in the reflection region set by using the equations 1 to 9 can be 60°. As a result, a trans-reflective type IPS-LCD device having a single cell gap structure in a reflection region and a transmission region can be implemented.

Figure 5:
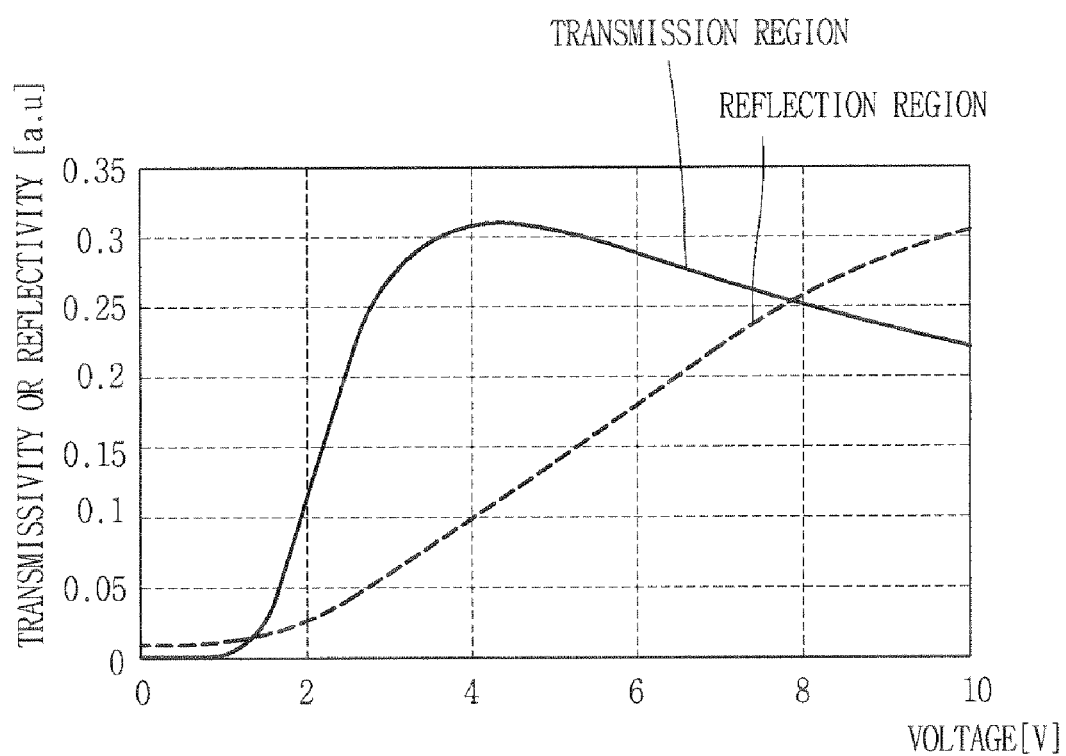
FIG. 5 is a graph showing optical transmissivity in a transmission region, and optical reflectivity in a reflection region according to voltages.

The trans-reflective type IPS-LCD device having the angle (α) of 30° and the twisted angle (θ) of 60° has optical transmissivity in the transmission region and optical reflectivity in the reflection region according to voltages, which is shown in FIG. 5.

Referring to FIG. 5, when the LC is not driven, optical transmissivity in the transmission region and optical reflectivity in the reflection region are close to '0', thereby implementing 'black'. On the contrary, when the LC is driven as voltages are applied thereto, the optical transmissivity and optical reflectivity are gradually increased to implement 'white'.

That is, in the trans-reflective type LCD device, when the LC is not driven as voltages are not applied thereto, the transmission region and the reflection region implements 'black'. However, when the LC is driven as voltages are supplied thereto, the transmission region and the reflection region implements 'white'. Accordingly, 'normally black' is stably implemented.

The trans-reflective type LCD device may be further provided with non-alignment regions 215 and 216 at an interface between the transmission region and the reflection region, which will be explained with reference to FIGS. 6, and 7A to 7C. The trans-reflective type LCD device of FIGS. 6, and 7A to 7C has the same components as those of FIGS. 2 to 5 except for the non-alignment regions 215 and 216, and thus only the non-alignment regions 215 and 216 will be explained in more detail.

Figure 6:
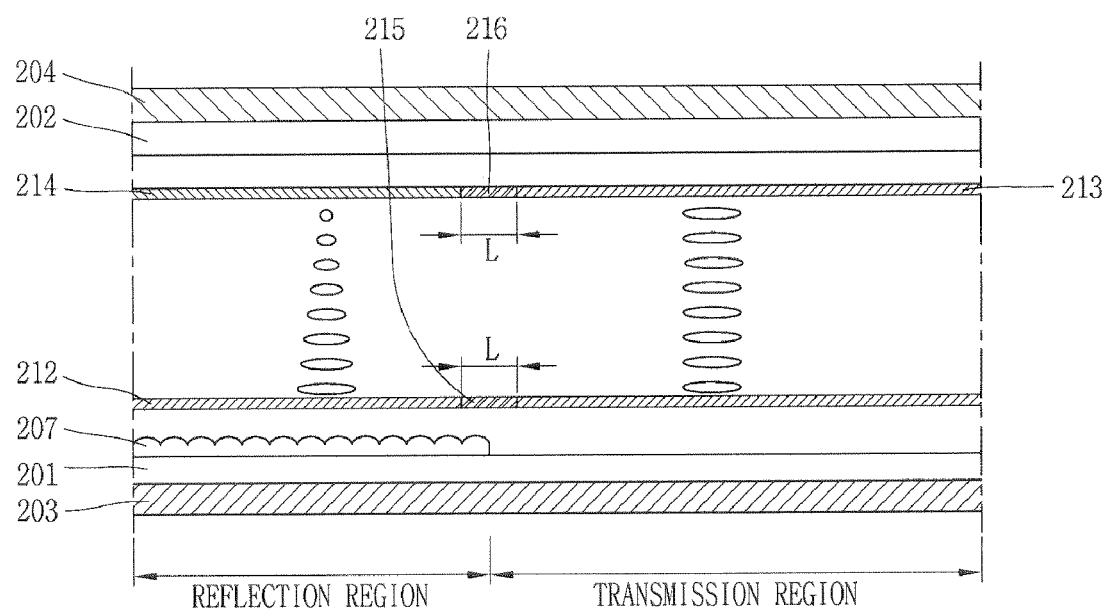
FIG. 6 is a planar view of an LCD device according to another embodiment of the present invention.

Referring to FIG. 6, a first alignment layer 212 rubbed in the same direction as a transmission axis of a lower polarizer 203 is formed on a first substrate 201, and a second alignment layer 213 rubbed in the same direction as the transmission axis of the lower polarizer 203 is partially formed in the transmission region on the second substrate 102. A third alignment layer 214 rubbed in a direction having a predetermined angle from a transmission axis of an upper polarizer 204 is partially formed in the reflection region on the second substrate 202.

A first non-alignment region 215, a region having not undergone a rubbing process is formed at an interface between the reflection region and the transmission region on the first substrate 201. And, a second non-alignment region 216, a region having not undergone a rubbing process is formed at an interface between the reflection region and the transmission region on the second substrate 202.

Referring to FIG. 6, the LC in the reflection region and the LC in the transmission region have alignment characteristics different from each other, which may cause disclination at an interface between the reflection region and the transmission region. In order to minimize the occurrence rate of disclination, the first and second non-alignment regions 215 and 216 are formed at an interface between the reflection region and the transmission region.

The reasons why the occurrence rate of disclination is minimized will be explained with reference to FIGS. 7A to 7C.

Figure 7A:
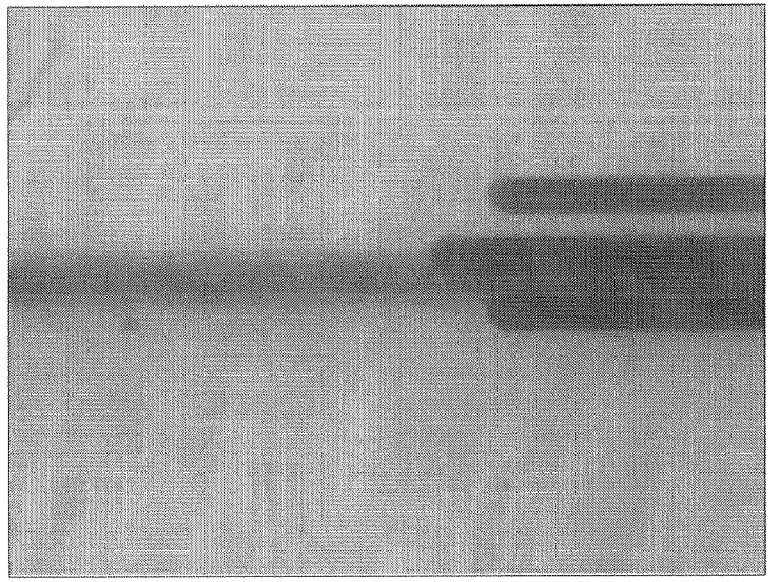
Figure 7B:
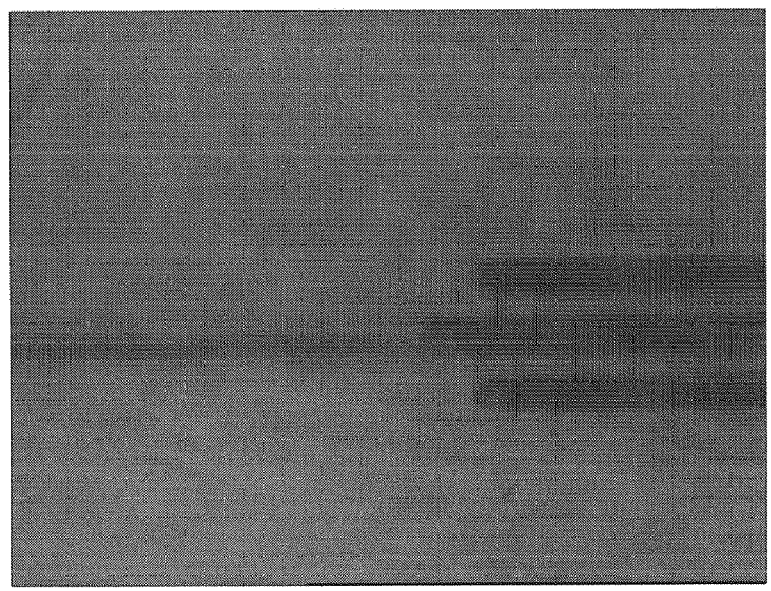
Figure 7C:
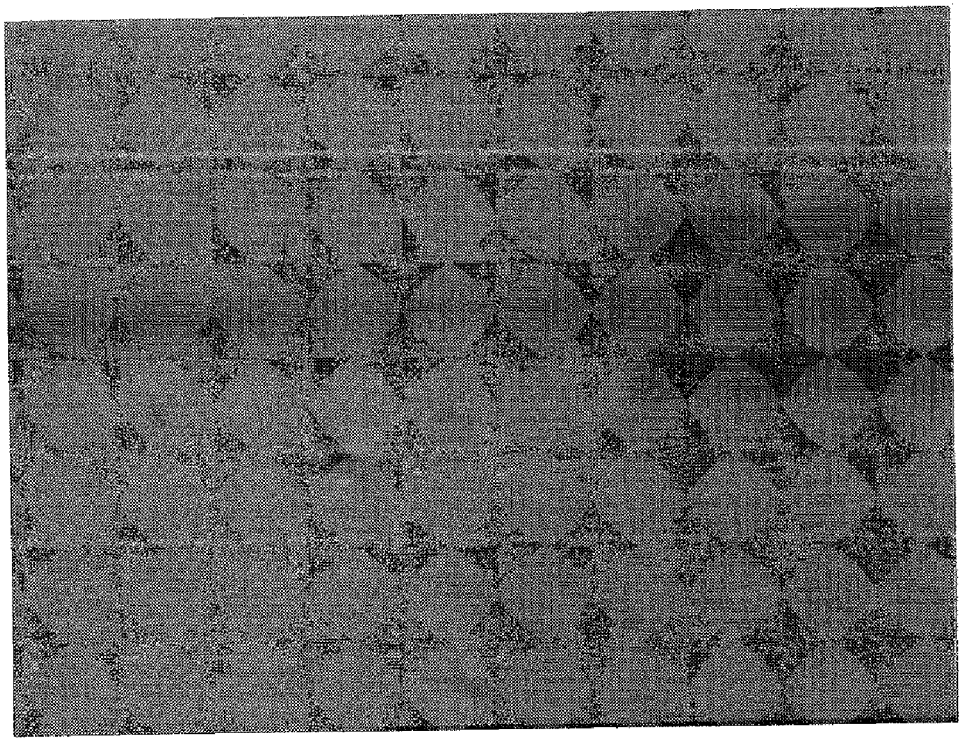

FIGS. 7A to 7C are photos of pixels according to driving of the LC. FIG. 7A is a photo showing a pixel when non-alignment regions do not exist at an interface between a transmission region and a reflection region. And FIGS. 7B and 7C are photos each showing a pixel when a first non-alignment region 215 and a second non-alignment region 216 are formed to have a width (L) of 2 μm and 4 μm, respectively.

FIGS. 7A to 7C are photos each showing one pixel. Above the pixel, a transmission region is formed. Below the pixel, a reflection region having a reflection layer 207 is formed. And, a dark region at an interface between the reflection region and the transmission region indicates a disclination.

Referring to FIG. 7A, when non-alignment regions are not provided at an interface between the reflection region and the transmission region, a thick disclination is formed. On the contrary, as shown in FIGS. 7B and 7C, when the non-alignment regions are provided at the interface between the reflection region and the transmission region, a very thin disclination is formed.

Accordingly, as the first and second non-alignment regions are provided at the interface between the reflection region and the transmission region, occurrence of disclination is minimized to enhance a display quality of the trans-reflective type LCD device.

The foregoing embodiments and advantages are merely exemplary and are not to be construed as limiting the present invention. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A liquid crystal display (LCD) device, comprising:
a first substrate and a second substrate that define a reflection region and a transmission region each having the same call gap (d);
a first alignment layer formed on the first substrate;
a second alignment layer formed on the second substrate facing the first substrate in the transmission region;
a third alignment layer formed in the reflection region on the second substrate facing the first substrate;
a lower polarizer formed below the first substrate;
an upper polarizer formed above the second substrate, and having a transmission axis perpendicular to a transmission axis of the lower polarizer;
a pixel electrode and a common electrode formed on the first substrate, and forming a horizontal electric field;
a reflection layer formed in the reflection region on the first substrate, and reflecting light incident from outside; and
a liquid crystal (LC) layer formed between the first substrate and the second substrate,
wherein the first and second alignment layers have characteristics to align the LC in the transmission region in the same direction as the transmission axis of the lower polarizer,
wherein the third alignment layer has characteristics to allow the LC in the reflection region to be twisted from a lower side to an upper side with a predetermined twisted angle (θ), and
wherein the twisted angle (θ) of the LC in the reflection region, and an angle (α) between an alignment direction of an uppermost LC in the reflection region and the transmission axis of the upper polarizer are set so that optical reflectivity in the reflection region is '0' when the LC is not driven.

2. The LCD device of claim 1, wherein the LC in the reflection region is aligned to be twisted from a lower side to an upper side with a twisted angle of 5°~85°, and
wherein the uppermost LC in the reflection region is aligned so as to have an angle (α) of 5°~85° from the transmission axis of the upper polarizer.

3. The LCD device of claim 1, wherein optical reflectivity (R) in the reflection region is defined by an equation using Jone's matrix, $$R = \left| (\cos\alpha \sin\alpha) HMHM \begin{pmatrix} \cos\alpha \\ \sin\alpha \end{pmatrix} \right|^2,$$

herein $$H = \begin{pmatrix} \cos\alpha & \sin\alpha \\ \sin\theta & -\cos\theta \end{pmatrix}, M = \begin{pmatrix} A - iB & -C - iD \\ C - iD & A + iB \end{pmatrix}$$

$$A = \cos\theta\cos\beta d + \frac{\theta}{\beta d}\sin\theta\sin\beta d$$

$$B = \frac{k_a}{\beta}\cos\theta\sin\beta d$$

$$C = \sin\theta\cos\beta d - \frac{\theta}{\beta d}\cos\theta\sin\beta d$$

$$D = \frac{k_a}{\beta}\sin\theta\sin\beta d$$

$$k_a = \pi\Delta n/\lambda$$

$$\beta d = (k_a^2 d^2 + \theta^2)^{\frac{1}{2}}$$

'd' denotes a cell gap between the first and second substrates, Δn denotes refractive anisotropy of the LC, and 'λ' denotes a wavelength of light.

4. The LCD device of claim 1, wherein a phase difference (Δnd) of the LC is about 300 nm~340 nm, the twisted angle (θ) of the LC in the reflection region is 50°~70°, and the angle (α) between an alignment direction of an uppermost LC in the reflection region and the transmission axis of the upper polarizer is within a range of 30°~40°.

5. The LCD device of claim 1, wherein non-alignment regions are provided at an interface between the reflection region and the transmission region on the first and second substrates.

6. A method for designing a liquid crystal display (LCD) device, comprising:
preparing first and second substrates that define a reflection region and a transmission region each having the same call gap (d);
forming a pixel electrode and a common electrode on the first substrate;
forming a reflection layer in the reflection region on the first substrate;
forming a first alignment layer on the first substrate;
forming a second alignment layer in the transmission region on the second substrate, and forming a third alignment layer in the reflection region on the second substrate;
forming a lower polarizer below the first substrate;
forming an upper polarizer above the second substrate, the upper polarizer having a transmission axis perpendicular to a transmission axis of the lower polarizer; and
forming an LC layer formed between the first and second substrates,
wherein the first and second alignment layers undergo rubbing treatment so that the LC in the transmission region between the first and second substrates alignment can be aligned in the same direction as the transmission axis of the lower polarizer,
wherein the third alignment layer undergoes rubbing treatment so that the LC in the reflection region can be twisted from a lower side to an upper side with a predetermined twisted angle (θ), and
wherein the twisted angle (θ) of the LC in the reflection region, and an angle (α) between an alignment direction of an uppermost LC in the reflection region and the transmission axis of the upper polarizer are set so that optical reflectivity in the reflection region is '0' when the LC is not driven.

7. The method of claim 6, wherein the angle (α) between an alignment direction of an uppermost LC in the reflection region and the transmission axis of the upper polarizer is set within a range of 5°~85°.

8. The method of claim 6, wherein optical reflectivity (R) in the reflection region is defined by an equation using Jone's matrix, $$R = \left|(\cos\alpha \sin\alpha) HMHM \begin{pmatrix} \cos\alpha \\ \sin\alpha \end{pmatrix}\right|^2,$$

herein $$H = \begin{pmatrix} \cos\alpha & \sin\alpha \\ \sin\theta & -\cos\theta \end{pmatrix}, M = \begin{pmatrix} A - iB & -C - iD \\ C - iD & A + iB \end{pmatrix}$$

$$A = \cos\theta \cos\beta d + \frac{\theta}{\beta d}\sin\theta \sin\beta d$$

$$B = \frac{k_a}{\beta}\cos\theta \sin\beta d$$

$$C = \sin\theta \cos\beta d - \frac{\theta}{\beta d}\cos\theta \sin\beta d$$

$$D = \frac{k_a}{\beta}\sin\theta \sin\beta d$$

$$k_a = \pi \Delta n / \lambda$$

$$\beta d = (k_a^2 d^2 + \theta^2)^{\frac{1}{2}}$$

'd' denotes a cell gap between the first and second substrates, Δn denotes refractive anisotropy of the LC, and 'λ' denotes a wavelength of light.

* * * * *